US006601181B1

(12) United States Patent
Thomas

(10) Patent No.: US 6,601,181 B1
(45) Date of Patent: Jul. 29, 2003

(54) UNINTERRUPTIBLE POWER SUPPLY APPARATUS AND METHOD

(75) Inventor: Keith Thomas, Vermillion, SD (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/461,055

(22) Filed: Dec. 14, 1999

(51) Int. Cl.[7] .............................................. G06F 1/30
(52) U.S. Cl. ...................................................... 713/340
(58) Field of Search ................. 713/300, 330, 713/340

(56) References Cited

U.S. PATENT DOCUMENTS

| | | | |
|---|---|---|---|
| 4,763,333 A | 8/1988 | Byrd ............................ 371/66 |
| 4,868,832 A | * 9/1989 | Marrington et al. ........... 371/66 |
| 5,021,983 A | 6/1991 | Nguyen et al. .............. 364/707 |
| 5,057,697 A | * 10/1991 | Hammond et al. ............ 307/66 |
| 5,339,446 A | 8/1994 | Yamasaki et al. ............ 395/750 |
| 5,530,877 A | 6/1996 | Hanaoka ...................... 395/750 |
| 5,598,567 A | 1/1997 | Ninomiya .................... 395/750 |
| 5,603,038 A | 2/1997 | Crump et al. ................ 395/750 |
| 5,708,819 A | 1/1998 | Dunnihoo .................... 395/750 |
| 5,751,950 A | 5/1998 | Crisan ..................... 395/188.01 |
| 5,765,001 A | 6/1998 | Clark et al. ............. 395/750.08 |
| 5,781,448 A | * 7/1998 | Nakamura et al. ........... 364/492 |
| 5,815,409 A | 9/1998 | Lee et al. .................. 364/528.21 |
| 5,838,929 A | 11/1998 | Tanikawa .................... 395/282 |
| 5,870,613 A | 2/1999 | White et al. ............. 395/750.01 |
| 5,903,765 A | 5/1999 | White et al. ............. 395/750.02 |
| 5,923,099 A | 7/1999 | Bilir ............................. 307/64 |
| 5,925,129 A | 7/1999 | Combs et al. ............... 713/300 |
| 5,944,828 A | 8/1999 | Matsuoka .................... 713/323 |
| 5,944,831 A | 8/1999 | Pate et al. ................... 713/324 |
| 6,204,573 B1 | * 3/2001 | Green et al. ................... 307/66 |
| 6,298,449 B1 | * 10/2001 | Carter .......................... 713/340 |

OTHER PUBLICATIONS

Silverline Power Conversion, LLC, *Silverline Power: Internal UPS* (last modified Aug. 6, 1999) <http://www.silverline-power.com/index.html>.

Silverline Power Conversion, LLC, *Products* (last modified Jun. 26, 1999) <http://www.silverline-power.com/products.htm>.

Silverline Power Conversion, LLC, *Powerbay* (last modified Jun. 26, 1999) <http://www.silverline-power.com/powerbay.htm>.

Silverline Power Conversion, LLC, *Powerbar* (last modified Jun. 26, 1999) <http://www.silverline-power.com/powerbar.htm>.

Silverline Power Conversion, LLC, *FAQs* (last modified Jun. 26, 1999) <http://www.silverline-power.com/faqs.htm>.

* cited by examiner

Primary Examiner—Dennis M. Butler
(74) Attorney, Agent, or Firm—Scott Charles Richardson; Mark S. Walker

(57) ABSTRACT

An uninterruptible power supply system and method for an information handling system provides an internal power storage device for supplying power to an information handling system and a detector for detecting the condition of an external power supply and/or the power level of the internal power storage device, wherein the power management system prevents the information handling system from resuming operation until the detector detects that an external power supply has been stable for a predetermined period of time and/or that the power level of the power storage device is sufficient to permit the information handling system to perform a data saving function.

31 Claims, 11 Drawing Sheets

UNINTERRUPTIBLE POWER SUPPLY APPARATUS AND METHOD

FIELD OF THE INVENTION

The present invention relates generally to information handling systems including computer systems and related devices which store data in volatile and nonvolatile memory. and, more particularly, to an uninterruptible power.supply system and method for providing a backup power supply for such systems.

BACKGROUND OF THE INVENTION

Information handling systems such as computers are used in all areas of business and personal use and require reliable power to operate effectively. At times, the public utility power source, may not be sufficient. If the utility power source fails, important operations may not be performed and valuable electronic data may become lost or corrupted.

To cope with such power source failure, an uninterruptible power supply (UPS) may be used. UPS systems contain a battery and are connected between an information handling system and the power source. In the event of a power failure or power dropping to an unacceptable voltage level, the battery may be used to provide battery power to operate the system. Since the cost of a UPS system is proportional to the length of available backup time, typical UPS systems are limited to a few minutes of backup capacity, i.e., so that a user has enough time to save his or her work and power down the information handling system in an orderly manner.

UPS systems may be advantageously employed for even commonplace information handling tasks, such as those performed with a desktop computer. For example, in a conventional personal computing environment, the use of write back caches, wherein updated data intended for the disk is temporarily stored in volatile RAM to improve performance, increases the chance that data will be lost in the event of a power failure occurs. It would, therefore, be desirable to provide a UPS system that is cost effective for use in everyday information handling tasks.

One shortfall of typical UPS systems is that a user must be present to manually shut down the system is power is interrupted, particularly where a computer is running unattended, for example, where the computer is performing a monitoring application or other continuous application, or, where the user is simply away from the computer. To overcome this shortcoming, various prior art schemes for automatically saving the system state and shutting down the system are known in the art.

For example, in U.S. Pat. No. 5,603,038 there is disclosed a method for automatic restoration of user options after a power loss. The reference discloses four computer states: a normal operating state, a standby state, a suspend state, and an off state. In one embodiment, waking a computer for a user-specified event that would not be lost if power is disrupted is disclosed. This is accomplished with a preprogrammed microcontroller interfaced to the system and powered by an auxiliary power supply. Another embodiment discloses saving the state of the computer system to the fixed disk storage device prior to turning the power supply off.

U.S. Pat. No. 5,021,983 discloses a suspend/resume apparatus and method for reducing power consumption in a battery powered computer. Suspending operation of a computer is performed by storing the state of the computer in RAM and disconnecting power to all other components in the computer. When resumption of operation is commanded, power is restored to all components and the computer state is restored from RAM, allowing operations to continue from the same point as when they were suspended.

U.S. Pat. No. 5,765,001 discloses a computer system which is operative to change from a normal operating state to a suspend state when a power supply thereof detects that an external source is no longer providing power to said power supply at a predetermined level. One embodiment discloses a power management circuit connected to an internal power source wherein the power management circuit causes the computer system to change to the suspend state wherein the entire state of the system is safely saved to a non-volatile storage device.

U.S. Pat. No. 5,530,877 discloses an apparatus for providing continuity of operation in a computer. One embodiment discloses a save process start detector which manages and determines the timing at which the system state is to be saved. The save process is triggered by turning off a power switch, a low battery state, an instruction from the system user, and the like. Once the determination to save the system status is. made, the system state is output to an external nonvolatile memory.

U.S. Pat. No. 5,598,567 discloses an apparatus for controlling a power supply in a computer,system by introducing delays before activation and deactivation of power. In one embodiment, a computer system can properly operate even when the power supply is reactivated immediately after its deactivation or when the power supply is deactivated during the execution of a resume process.

However, there does not exist in the art a UPS system and method for preventing the system from resuming from a suspended state until after a predetermined period of time has elapsed, after which time it is reasonably safe to assume that the external power supply is stable. Furthermore, there does not exist in the art a UPS system and method for preventing the system from resuming until the backup power supply has sufficient capacity to maintain power long enough to.perform another system restoration should the external AC power fail again.

SUMMARY OF THE INVENTION

In one aspect, the present invention provides a power management system and method for an information handling system comprising a power storage device for supplying power to the information handling system and a detector for detecting the power level of the power storage device, wherein the power management system prevents the information handling system from resuming operation until the detector detects that the power level of the power storage device is sufficient to permit the informnation handling system to perform a data saving function.

In another aspect, the present invention provides a power management system and method for an information handling system comprising a power storage device for supplying power to the information handling system and a detector for detecting the power level of the power storage device, wherein the power management system prevents the information handling system from resuming operation until the detector detects that an external power supply has been stable for a predetermined period of time.

In another aspect, the present invention provides an information handling system and method comprising a power storage device for supplying power to the information handling system and a detector for detecting the power level of the power storage device, wherein the information handling system is prevented from resuming operation until the detector detects that the power level of the power storage device is sufficient to permit the info pration handling system to perform a data saving function.

In yet another aspect, the present invention provides an information handling system and method comprising a power storage device for supplying power to the information handling system and a detector for detecting the power level of the power storage device, wherein the information handling system is prevented from resuming operation until the detector detects that an external power supply has been stable for a predeterm period of time.

It is to be understood that both the foregoing general description and the following detailed description are exemplary and explanatory only and are not restrictive of the invention as claimed. The accompanying drawings, which are incorporated in and constitute a part of the specification, illustrate presently preferred embodiments of the invention, and together with the general description given. above and the detailed description of the preferred embodiments given below, serve to explain the principles of the invention.

BRIEF DESCRIPTION OF THE DRAWINGS

The detailed description of the invention may be best understlod when read in reference to the accompany drawings wherein.

DETAILED DESCRIPTION OF THE INVENTION

Figure 1:
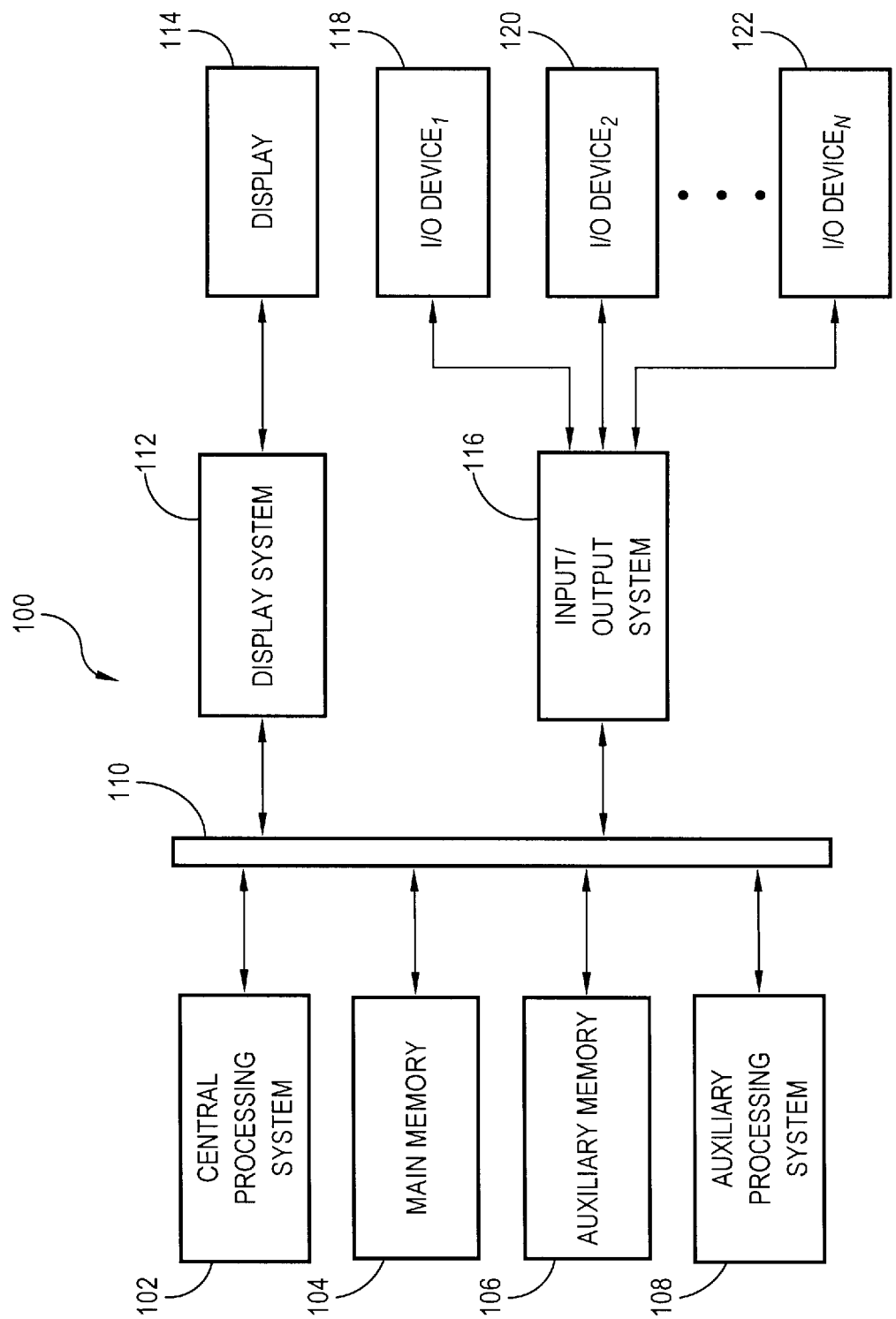
FIG. 1 is a block diagram illustrating a hardware system in accordance with the present invention.

Referring now to FIG. 1, an information handling system operable to embody the present invention is shown. The hardware system 100 shown in FIG. 1 is generally representative of the hardware architecture of a computer-based information handling system of the present invention. The hardware system 100 is controlled by a central processing system 102. The central processing system 102 includes a central processing unit such as a microprocessor or microcontroller for executing programs, performing data manipulations and controlling the tasks of the hardware system 100. Communication with the central processor 102 is implemented through a system bus 110 for transferring information among the components of the hardware system 100. The bus 110 may include a data channel for facilitating information transfer between storage and other peripheral components of the hardware system. The bus 110 further provides the set of signals required for communication with the central processing system 102 including a data bus, address bus, and control bus. The bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 100 include main memory 104, and auxiliary memory 106. The hardware system 100 may further include an auxiliary processing system 108 as required. The main memory 104 provides storage of instructions and data for programs executing on the central processing system 102. The main memory 104 is typically semiconductor-based memory such as dynamic random access memory (DRAM) and/or static random access memory (SRAM). Other semi-conductor-based memory types include, for example, synchronous dynamic random access memory (SDRAM), Rambus dynamic random access memory (RDRAM), ferroelectric random access memory (FRAM), and so on. The auxiliary memory 106 provides storage of instructions and data that are loaded into the main memory 104 before execution. The auxiliary memory 106 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). The auxiliary memory 106 may also include a variety of nonsemiconductor-based memories, including, but not limited to, magnetic tape, drum, floppy disk, hard disk, optical laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well. The hardware system 100 may optionally include an auxiliary processing system 108 which may include one or more auxiliary processors to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The hardware system 100 further includes a display system 112 for connecting to a display device 114, and an input/output (I/O) system 116 for connecting to one or more I/O devices 118, 120, up to Nnumber of I/O devices 122. The display system 112 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like.

The display device 114 may comprise a cathode ray-tube (CRT) type display such as a monitor or television, or may comprise an alternative type of display technology such as a projection-type display, liquid-crystal display (LCD), light-emitting diode (LED) display, gas or plasma display, electroluminescent display, vacuum fluorescent display, cathodoluminescent (field emission) display, plasma-addressed liquid crystal (PALC) display, high gain emissive display (HGED), and so forth.

The input/output system 116 may comprise one or more controllers or adapters for providing interface functions between the one or more I/O devices 118–122. For example, the input/output system 116 may comprise a serial port, parallel port, universal serial bus (USB) port, IEEE 1394 serial bus port, infrared port, network adapter, printer adapter, radio-frequency (RF) communications adapter, universal asynchronous receivertransmitter (UART) port, etc., for interfacing between corresponding I/O devices such as a keyboard, mouse, track ball, touch pad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, etc. The input/output system 116 and I/O devices 118–122 may provide or receive analog or digital signals for communication between the hardware system 100 of the present invention anrd external devices, networks, or information sources. The input/output system 116 and I/O devices 118–122 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks,. and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 100 of FIG. 1 by one having ordinary skill in the art would not depart from the scope or the spirit of the present invention.

Figure 2:
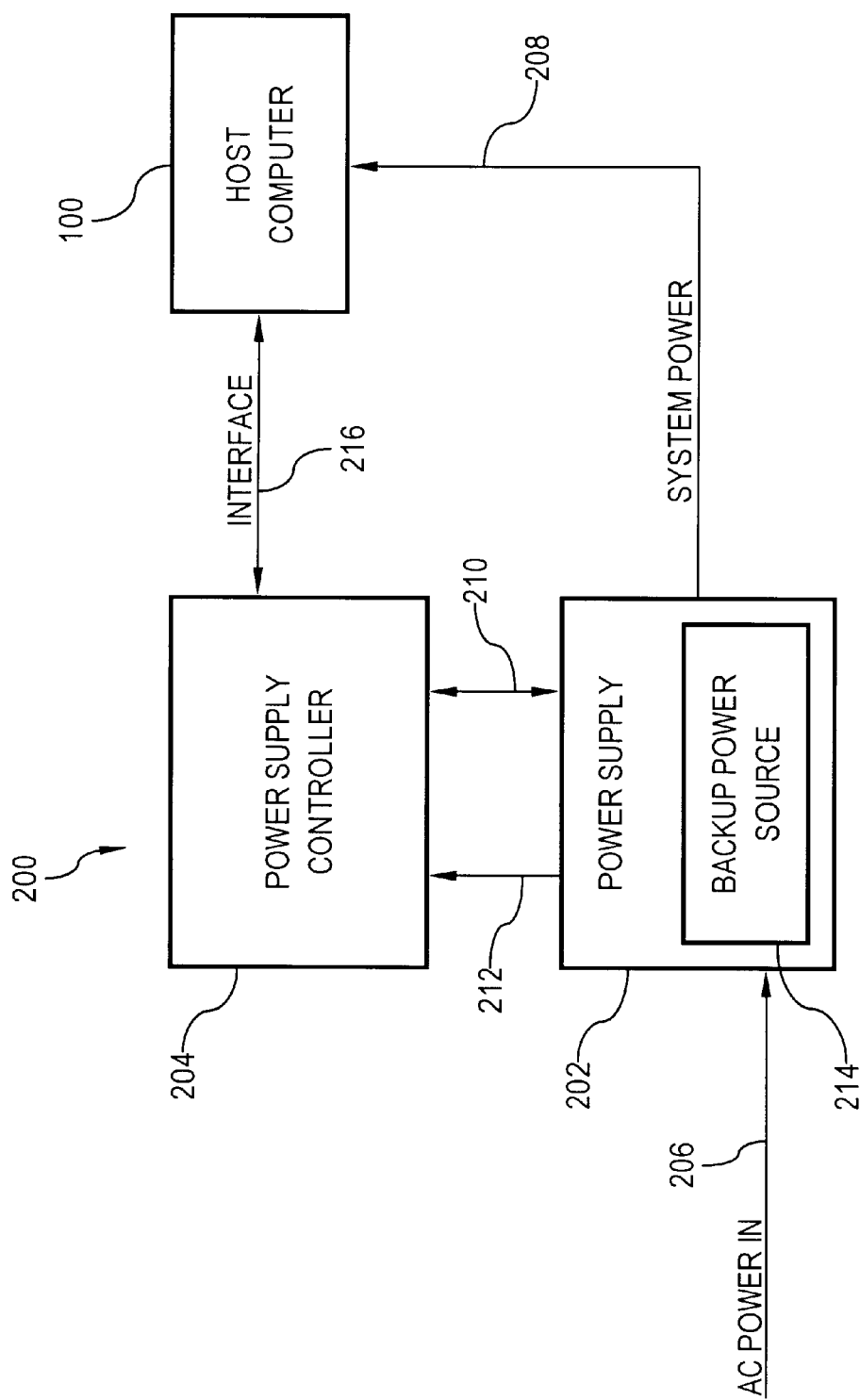
FIGS. 2 and 3 are block diagrams illustrating the uninterruptible power supply system accoding present invention.

Referring now to FIG. 2, there is shown a functional block diagram of an exemplary uninterruptible power supply system 200 in accordance with the present invention. The uninterruptible power supply system 200 according to the present invention comprises a power supply 202 and a power supply controller or processor 204. The power supply controller provides electronic control of the power supplied to host computer system 100. In a preferred embodiment, host computer 100 is a personal computer such as a portable or desktop computer and in a particularly preferred. embodiment, host computer 100 is a desktop personal computer. The power supply 202 provides power to both the host computer system 100 and power supply controller 204. The power supply 202 receives an AC input on line 206. Line 208 couples the power supply 202 to host computer system 100 to provide the system power. Power supply also provides power to power supply controller 204 on line 212. The output of power on line 208 is controlled by a control signal sent from the power supply controller 204 sent on line 210. Power supply controller 204 is interfaced to host computer 100 via data line 216.

Power supply 202 further comprises a backup power source 214, such as one or more rechargeable batteries or battery packs. Rechargeable batteries 214 are employed as backup power in the event that electrical power fails or otherwise drops to an unacceptable voltage level. In some embodiments, the power supply system 200 is configured as an online UPS wherein the a constant source of electrical power is provided by the battery 214 while the battery 214 is being recharged from the AC power source. In other embodiments, the power supply 200 is configured as an offline UPS or standby power system wherein the power supply switches to backup source 214 upon detection of a power failure.

In a preferred embodiment, UPS 200, comprising power supply 202 and controller 204, is integrated into the main housing of an information handling system 100 such as a personal computer, although it will be recognized that the UPS 200 may also be housed externally of the host computer 100.

Figure 3:
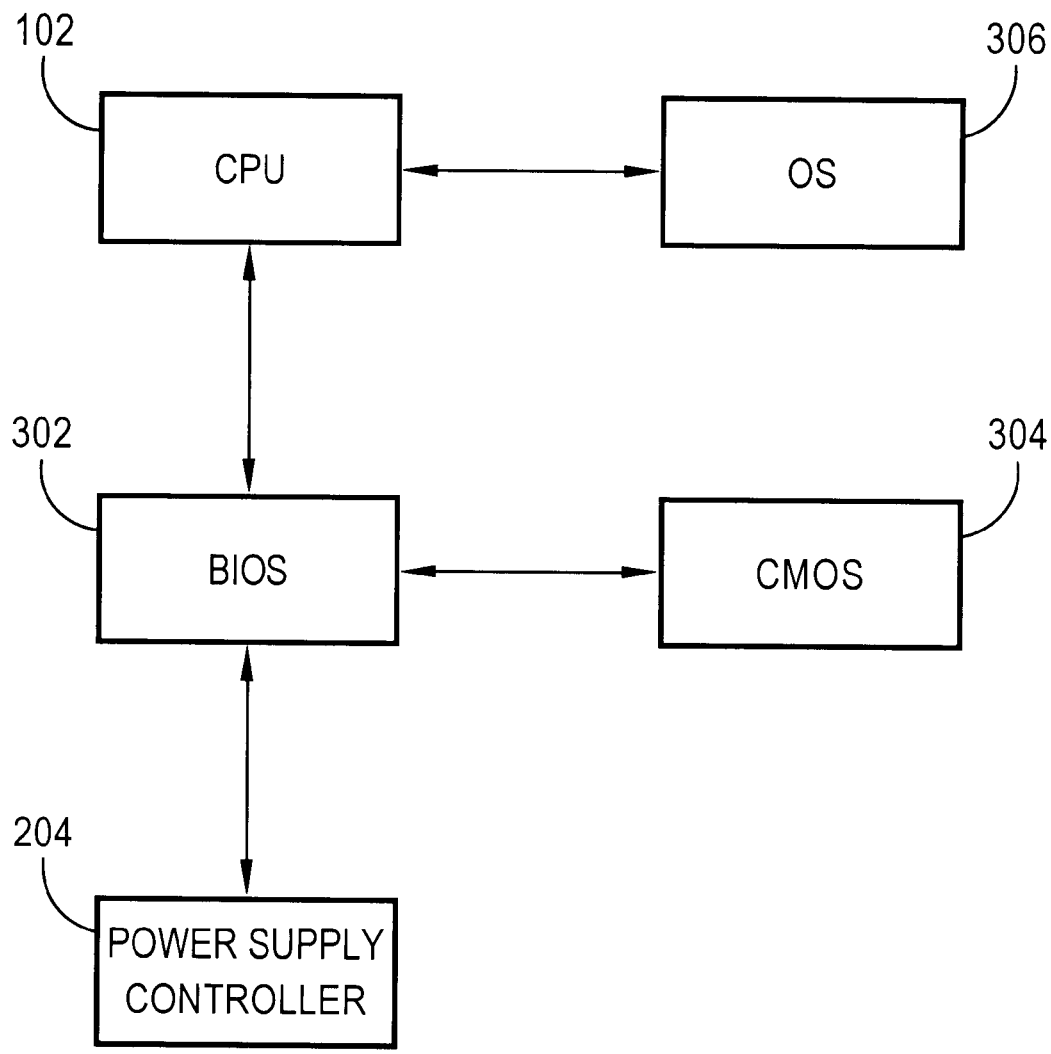

Referring now to FIG. 3, there is shown an exemplary system for transitioning between the suspend and resume states upon failure and restoration of external AC power. In the embodiment of FIG. 3, power supply controller 204 communicates with BIOS system 302. In an embodiment, power supply controller 204 issues signals to commence suspend and shutdown procedures in accordance with the present invention or to apprise operating system (OS) 306 of the power source status.

BIOS system 302 provides essential software routines to bootstrap the processor 102. BIOS system 302 interfaces with complimentary metal oxide (CMOS) RAM 304 which provides a system configuration utility accessible at boot time. Data may be stored in CMOS RAM 304 upon performing a suspend operation to indicate at the next start up that the system state has previously been saved. In one embodiment, operating system 306 includes the Advanced Power Management (APM) application programming interface and the present invention may employ the suspend and resume services thereof In another embodiment, operating system 306 includes the Advanced Configuration and Power Interface (ACPI) system and the present invention may employ the suspend and resume services thereof.

Figure 4:
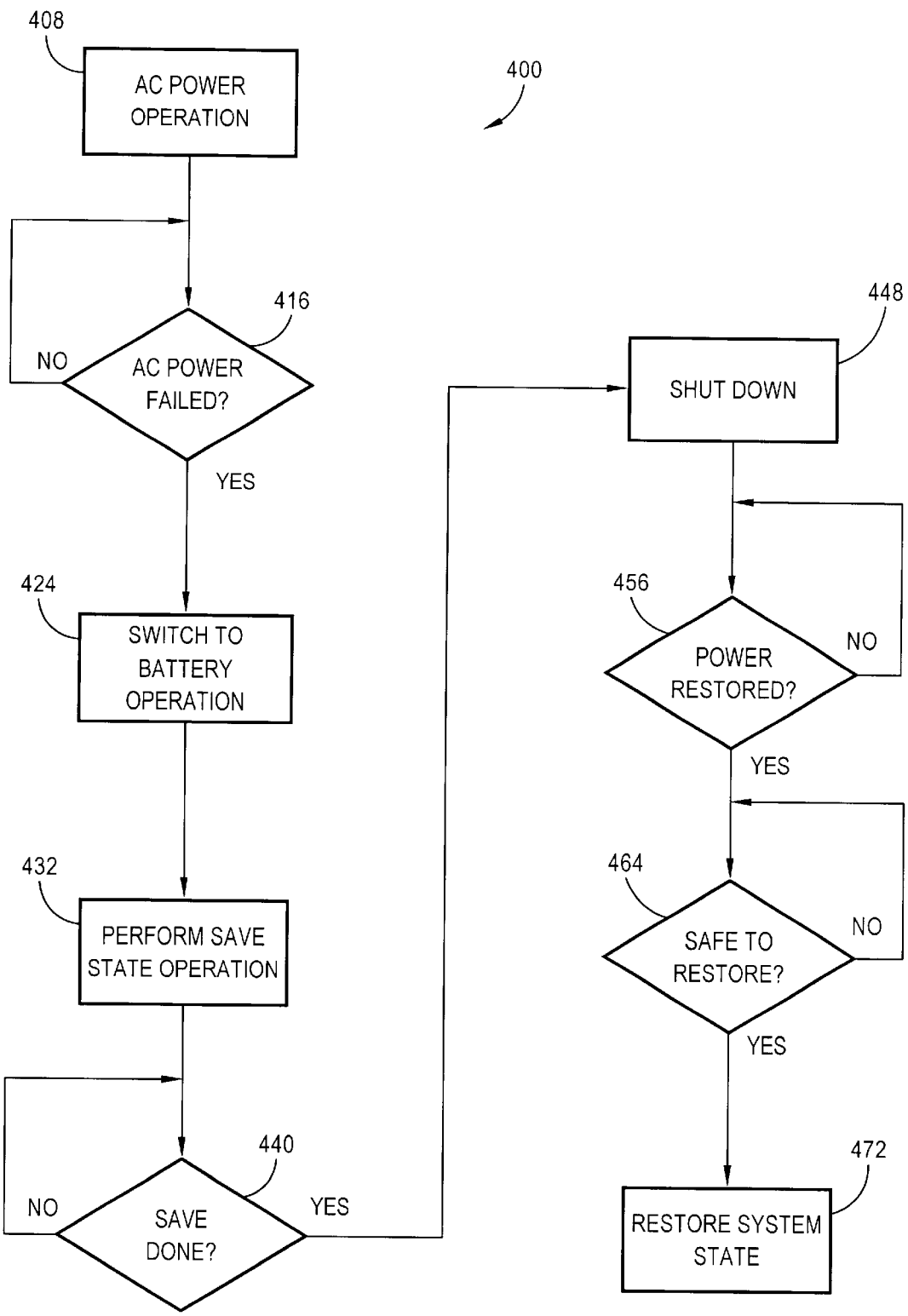
FIGS. 4–11 are flow diagrams illustrating som e of the presently preferred methods of operating an uninterruptiblebpower supply according to the present invention.

Referring now to FIG. 4, there is shown an exemplary method 400 in accordance with the present invention. At step 408, information handling system 100 (FIGS. 1 and 2) is operating on external AC power. During AC power operation, backup power source 214 (FIG. 2) is being recharged or kept in a charged state. At step 416, the external AC power supply 206 (FIG. 2) is monitored by power supply controller 204 (FIG. 2). Upon detecting a power failure (blackout condition) or reduction of the voltage to an unacceptable level (brownout condition) in step 416, the UPS 200 is switched to battery operation in step 424, with system power 208.(FIG. 2) being provided to the host system 100 (FIGS. 1 and 2) by backup power source 214 (FIG. 2).

After switching to backup battery operation, data characterizing the state of the hardware system is saved in step 432. The state of the hardware is saved in nonvolatile memory such as hard disk drive 106 (FIG. 1) such that it can be restored from the nonvolatile memory when the power is reapplied (hereinafter referred to as a "suspend to disk" operation). In one embodiment, the state of the hardware system is also or alternatively saved in volatile memory such as RAM 104 (FIG. 1) such that it can be restored from RAM when the power is reapplied (hereinafter referred to as a "suspend to RAM" operation). The suspend to RAM operation is advantageous in that the state of the system may be restored very quickly, however, it is disadvantageous in that the contents of RAM are lost when the power is removed. The suspend.to disk operation is advantageous in that the system state is preserved, even in the event of a complete loss of power. However, resuming from the suspend to disk state is more time consuming since the system state must be read from the hard disk drive.

In it not necessary that the backup power supply be provided to all components of the host system 100. For example, UPS 200 (FIG. 2) need provide only sufficient power so that during step 432, the main motherboard components (e.g., CPU, memory, control, I/O, PCI bus) may be kept operational long enough for the system state to be saved to disk. By supplying power to. only those components necessary to perform save state operation, the capacity of the backup power supply may be reduced, thus reducing the cost of the system. For example, where the suspend and shut down operation is to be performed automatically upon switching to backup power, it is not necessary to provide backup power to components not required for the suspend and shut down operation, such as a video display monitor and other components. In certain embodiments wherein user input is requested upon switching to backup power (see FIGS. 9 and 11), the video display hardware may be kept operational until user input is received and thereafter the video display hardware may be shut down.

Referring again to FIG. 4, after it is determined in step 440 that the suspend (save state) operation is completed, the remaining components are gracefully shut down in step 448. Where the optional suspend to RAM operation is performed in step 432 in addition to or instead of the suspend to disk operation, the memory and memory controller are kept operational to preserve the contents of RAM 104 (FIG. 1), powered by the UPS 200 (FIG. 2).

The process waits at step 456 until external AC power is restored. After a power failure, when the external AC power is restored, the AC power supply may not be stable and the backup power source will have been partially or completely depleted during the save state step 432. If the optional suspend to RAM operation was used, backup power is also consumed during the period of time that the power was out (i.e., during step 456) in preserving the contents of RAM. Thus, there is a possibility that the backup power source 214 (FIG. 2) may lack sufficient power (and sufficient time to recharge upon restoration of AC power) to perform another save state operation should the power fail again. To prevent the system from being restored with insufficient backup power to perform another save state operation and thus to prevent potential data loss should the power go out again soon after being restored, the present invention delays the restoration of the system state until it is determined that it is reasonably safe to do so. Thus, one or more predefined criteria are employed at step 464 to determnine whether it is safe to restore the system state. The restoration of the system state is delayed at step 464 until it is determined that the it is safe to restore the system state, at which point the system state saved at step 432 is restored in step 472. Thus, the host system 100 (FIGS. 1 and 2) is restored to the state that it was in prior to the power failure. If the optional suspend to RAM operation was employed at step 432 and if the power failure was not so long so as to cause a complete dissipation of backup power source 214 (FIG. 2) and thus loss of the contents of RAM, then the system state may be restored quickly from RAM at step 472. Otherwise, the system may be restored from the nonvolatile memory at step 472. The process 400 may then return to step 408.

The determination whether is it safe to restore the system state may be performed by a number of methods, which are illustrated in the embodiments that follow. For example, in the embodiment of FIG. 5, the restoration is delayed until the AC power has been restored and has remained stable for some predetermined period of time, after which time it is reasonably safe to assume that the power is stable and, therefore, safe to restore the system state. In the embodiment of FIG. 6, the restoration is delayed until the AC power has been restored and the backup power source has had time to recharge enough to perform another suspend to disk operation, after which time it is safe to restore the system state.

Figure 5:
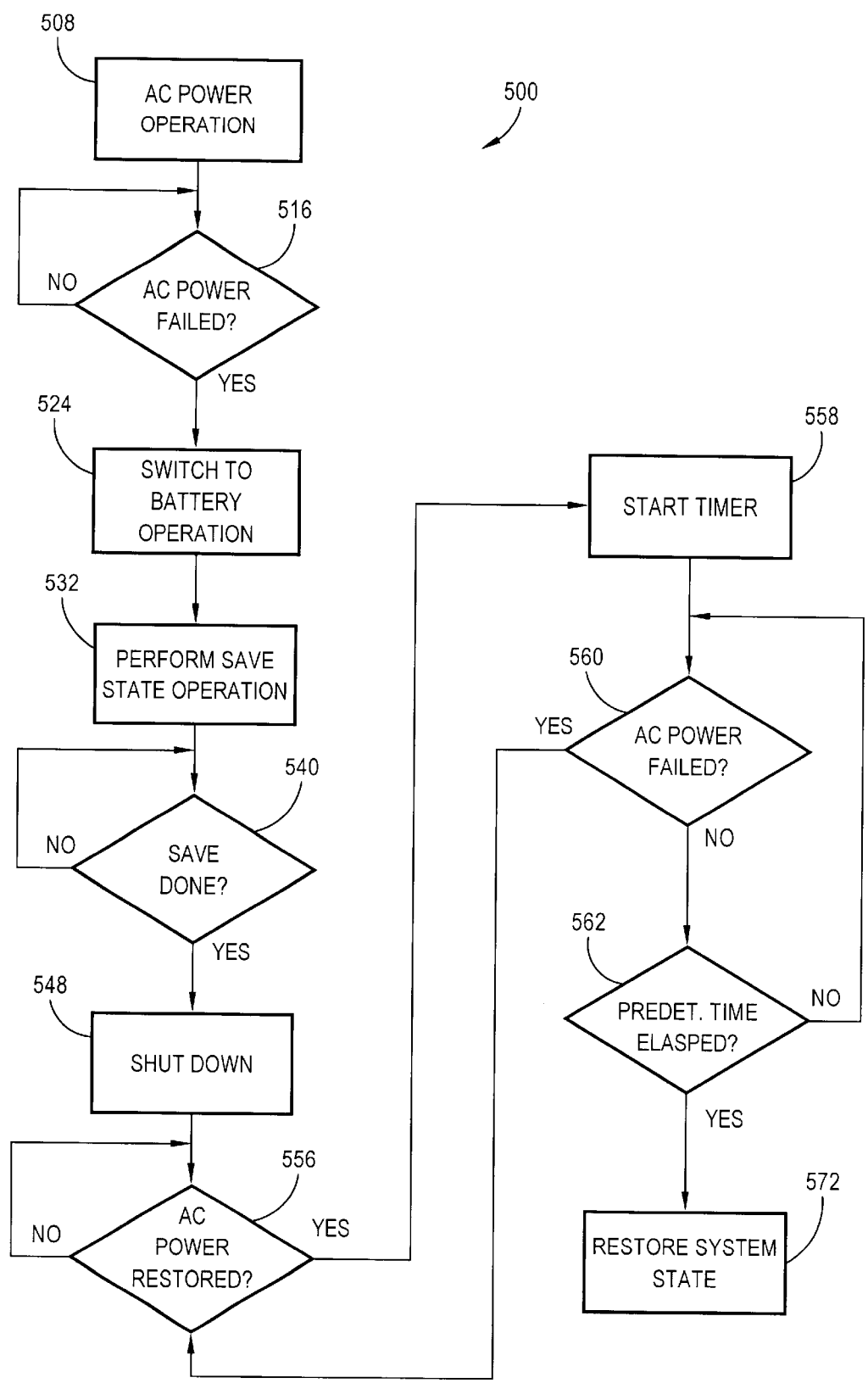
Figure 6:
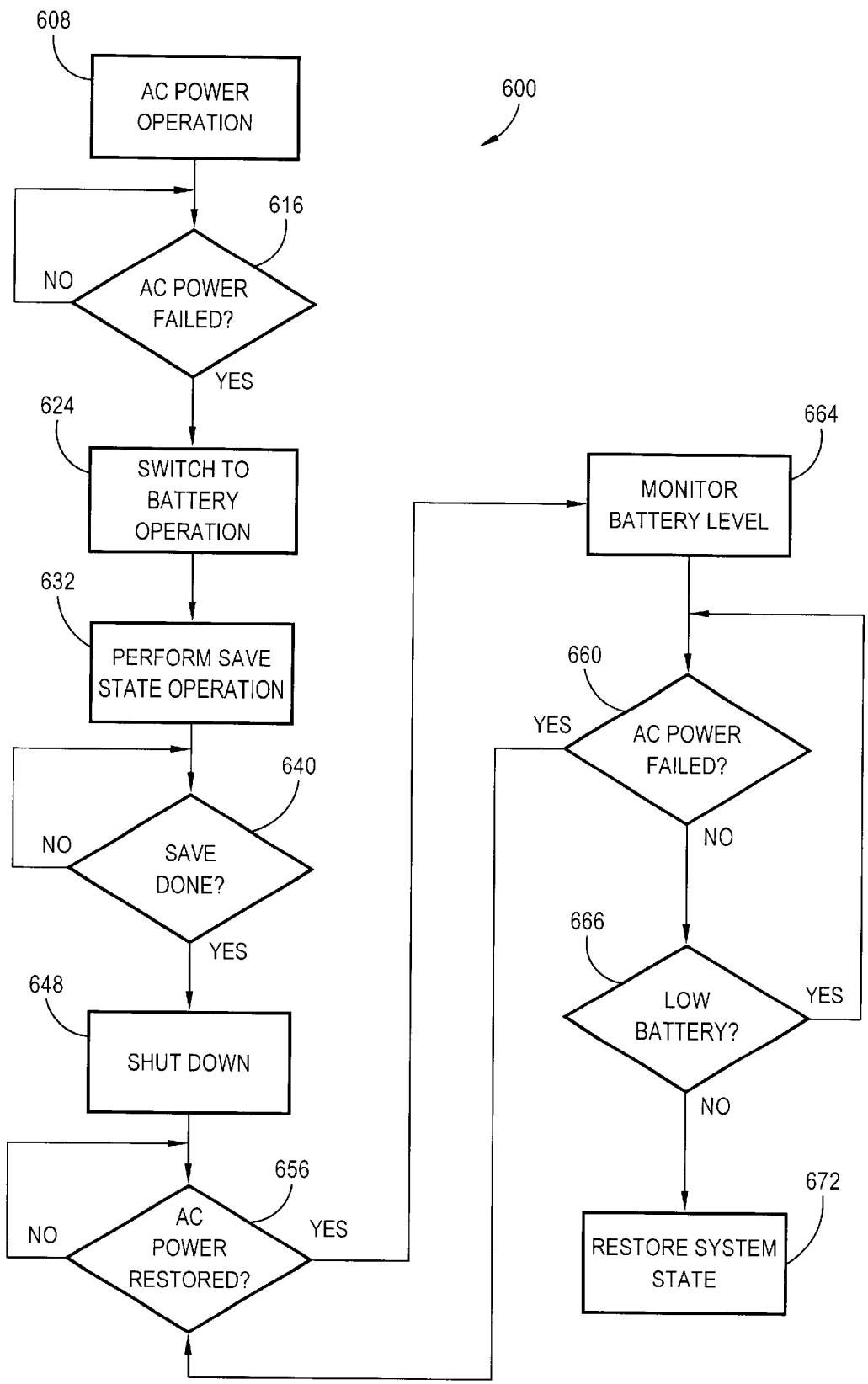

Referring now to FIG. 5, there is shown an exemplary method 500 in accordance with the present invention. At step 508, information handling system 100 (FIGS. 1 and 2) is operating on external AC power. During AC power operation, backup power source 214 (FIG. 2) is being recharged or kept in a charged state. At step 516, the external AC power supply 206 (FIG. 2) is monitored by power supply controller 204 (FIG. 2). Upon detecting a power failure (blackout condition) or reduction of the voltage to an unacceptable level (brownout condition) in step 516, the UPS 200 is switched to battery operation in step 524, with system power 208 (FIG. 2) being provided to the host system 100 (FIGS. 1 and 2) by backup power source 214 (FIG. 2).

After switching to backup battery operation, the state of the hardware system is saved in step 532, employing a suspend to disk operation and/or, optionally, a suspend to RAM operation, as detailed above.

In one embodiment, the UPS 200 (FIG. 2) provides sufficient power so that during step 532, the main motherboard components (e.g., CPU, memory, control, I/O, PCI bus) may be kept operational long enough for the system state to be saved to disk. After it is determined in step 540 that the suspend (save state) operation is completed, the remaining components are gracefully shut down in step 548. Where the optional suspend to RAM operation is performed in step 532 in addition to the suspend to disk operation, the memory and memory controller are kept operational to preserve the contents of RAM 104 (FIG. 1), powered by the UPS 200 (FIG. 2).

The process waits at step 556 until external AC power is restored. To prevent the system from being restored with insufficient backup power to perform another save state operation and thus to prevent potential data loss should the power go out soon after being restored, the present invention delays the restoration of the system state until it is determined that itis reasonably safe to do so. At step 558 a timer is started, at step 560, the external AC power is monitored, and at step 562 it is determined whether a predetermined period of time has elapsed since AC power was restored.

Process 500 loops at steps 560 and 562 until the predetermined period of time has elapsed. If another power failure should occur at step 560, the process returns to step 556 and waits until power is again restored. The process then continues to step 558 et seq. after the power is again restored.

If the power remains stable for the predetermined period of time in step 562, the system state is restored in step 572. The specific length of time itself is not an important aspect of the invention, and may be any period of time after which it may reasonably be assumed that the power will remain stable. The period of time may be, for example, from about 1 minute to about 10 minutes, and preferably about 5 minutes. Preferably, the length of time of the delay is user selectable.

In restoring the system state in step 572, the system state may be restored from the suspend to disk state, or, when the optional step of suspending the system state of RAM was performed and the backup power source 214 was not completely dissipated, the system may be resumed from the suspend to RAM state. The process 500 may then return to step 508 and resume normal AC operation.

Referring now to FIG. 6, there is shown an exemplary method 600 in accordance with the present invention. At step 608, information handling system 100 (FIGS. 1 and 2) is operating on external AC power. During AC power operation, backup power source 214 (FIG. 2) is being recharged or kept in a charged state. At step 616, the external AC power supply 206 (FIG. 2) is monitored by power supply controller 204 (FIG. 2). Upon detecting a power failure (blackout condition) or reduction of the voltage to an unacceptable level (brownout condition) in step 616, the UPS 200 is switched to battery operation in step 624, with system power 208 (FIG. 2) being provided to the host system 100 (FIGS. 1 and 2) by backup power source 214 (FIG. 2).

After switching to backup battery operation, the state of the hardware system is saved in step 632, employing a suspend to disk operation and/or, optionally, a suspend to RAM operation, as detailed above.

In one embodiment, the UPS 200 (FIG. 2) provides sufficient power so that during step 632, the main motherboard components (e.g., CPU, memory, control, I/O, PCI bus) may be kept operational long enough for the system state to be saved to disk. After it is determined in step 640 that the suspend (save state) operation is completed, the remaining components are gracefully shut down in step 648. Where the optional suspend to RAM operation is performed in step 632 in addition to or instead of the suspend to disk operation, the memory and memory controller are kept operational to preserve the contents of RAM 104 (FIG. 1), powered by the UPS 200 (FIG. 2).

The process waits at step 656 until external AC power is restored. To prevent the system from being restored with insufficient backup power to perform another save state operation and thus to prevent potential data loss should the power go out soon after being restored, the present invention delays the restoration of the system state until it is determined that backup power supply has sufficient charge to perform another save state operation. At step 664 the power of backup battery 214 (FIG. 2) is monitored, e.g., by monitoring the voltage, and at step 660 the external AC power is monitored. At step 666 it is determined whether backup power source 214 (FIG. 2) has sufficient power to perform a save state (suspend to disk) operation.

Process 600 loops at steps 660 and 666 until the backup battery 214 (FIG. 2) has attained a sufficient charge. If another power failure should occur at step 660, the process returns to step 656 and waits until power is again restored. The process then continues to step 664 et seq. after the power is again restored.

If the power remains stable long enough for the backup power source 214 (FIG. 2) to attain a sufficient charge to perform another save state operation, the system state is restored in step 672. In restoring the system state in step 672, the system state may be restored from the suspend to disk state, or, when the optional step of suspending the system state of RAM was performed and the backup power source 214 was not completely dissipated, the system may be resumed from the suspend to RAM state. The process 600 may then return to normal AC operation and return to step 608.

Figure 7:
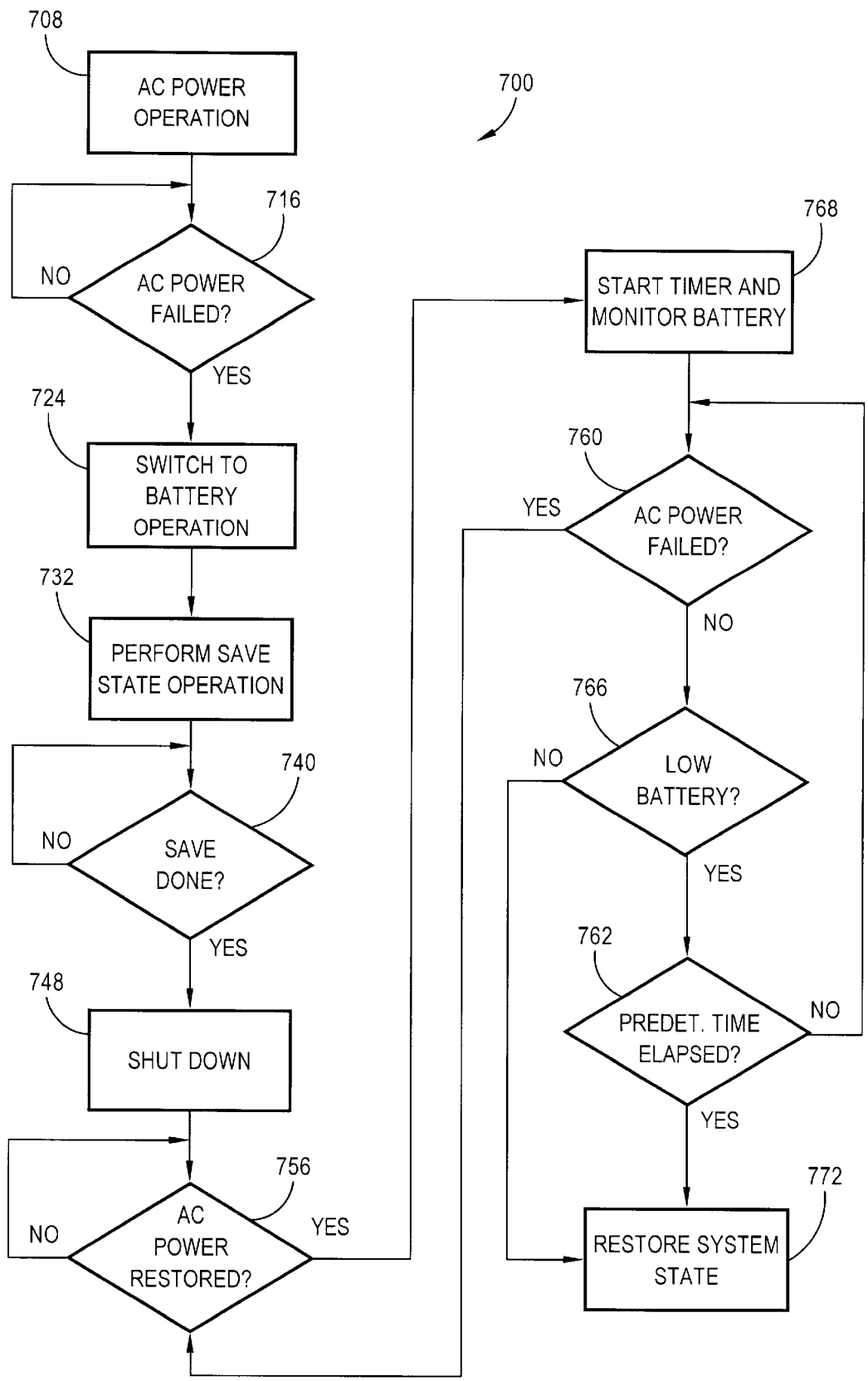

Referring now to FIG. 7, there is shown an exemplary method 700 in accordance with the present invention wherein restoration of the system state after a power failure is delayed until either a predetermined period of time has elapsed since the power was restored or the battery 214 has sufficient power to allow another save state operation to be performed. At step 708, information handling system 100 (FIGS. 1 and 2) is operating on external AC power. During AC power operation, backup power source 214 (FIG. 2) is being recharged or kept in a charged state. At step 716, the external AC power supply 206 (FIG. 2) is monitored by power supply controller 204 (FIG. 2). Upon detecting a power failure (blackout condition) or reduction of the voltage to an unacceptable level (brownout condition) in step 716, the UPS 200 is switched to battery operation in step 724, with system power 208 (FIG. 2) being provided to the host system 100 (FIGS. 1 and 2) by backup power source 214 (FIG. 2).

After switching to backup battery operation, the state of the hardware system is saved in step 732, employing a suspend to disk operation and, optionally, a suspend to RAM operation, as detailed above.

In one embodiment, the UPS 200 (FIG. 2) provides sufficient power so that during step 732, the main motherboard components (e.g., CPU, memory, control, I/O, PCI bus) may be kept operational long enough for the system state to be saved to disk. After it is determined in step 740 that the suspend (save state) operation is completed, the remaining components are gracefully shut down in step 748. Where the optional suspend to RAM operation is performed in step 732 in addition to the suspend to disk operation, the memory and memory controller are kept operational to preserve the contents of RAM 104 (FIG. 1), powered by the UPS 200 (FIG. 2).

The process waits at step 756 until external AC power is restored. Upon restoration of the external AC power at step 756, a timer is started and the battery voltage is monitored at step 768. The process loops at steps 760, 766, and 762. At step 760, should AC power fail again, process 700 returns to step 756. If either the predetermined time period elapses (step 762) or the battery has or attains a sufficient capacity to perform another save state operation, the system state is restored in step 772. In restoring the system state in step 772, the system state may be restored from the suspend to disk state, or, when the optional step of suspending the system state of RAM was performed and the backup power source 214 was not completely dissipated, the system may be resumed from the suspend to RAM state. The process 700 may then return to normal AC operation and return to step 708.

Figure 8:
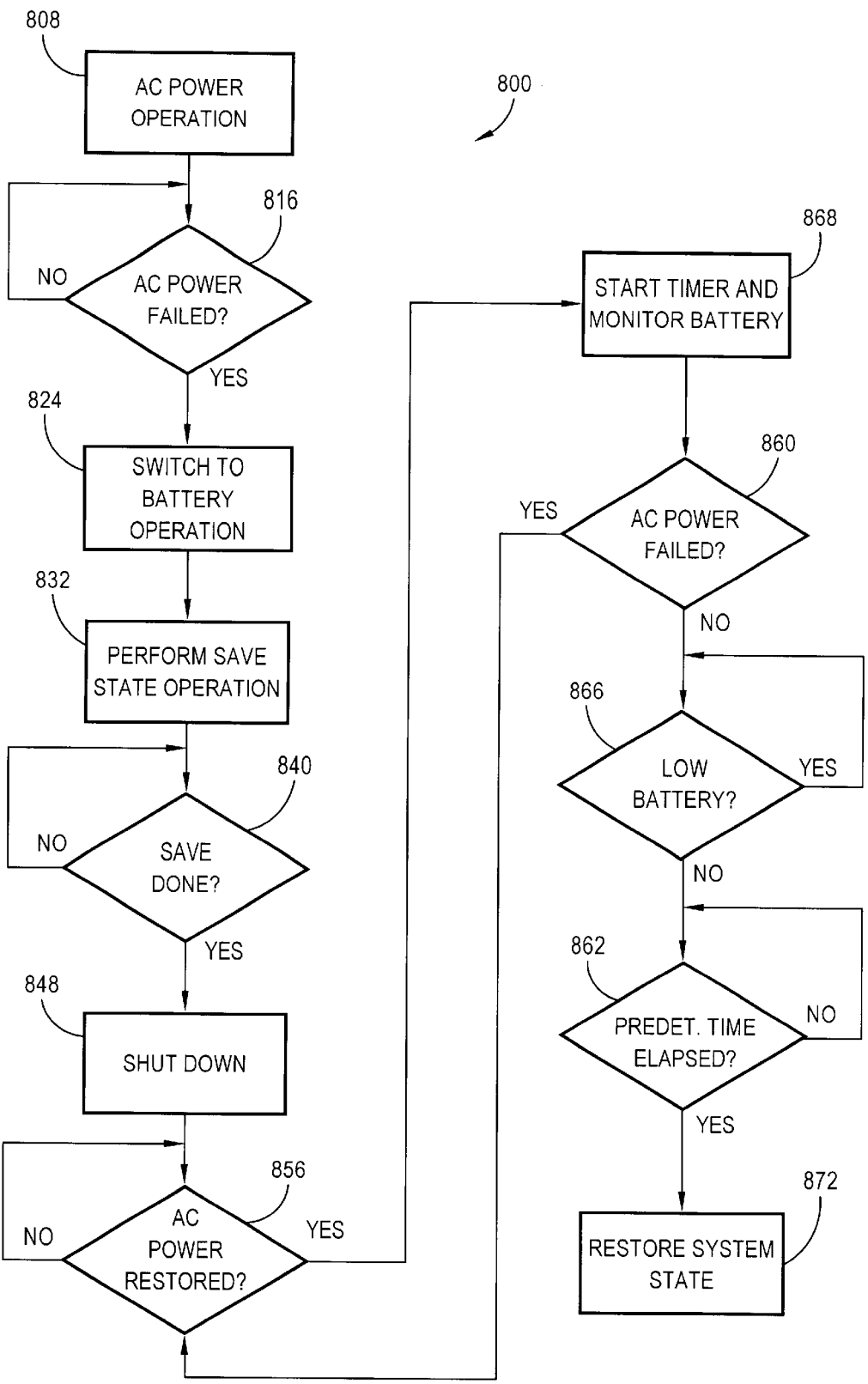

Referring now to FIG. 8, there is shown an exemplary method 800 in accordance with the present invention wherein restoration of the system state after a power failure is delayed until both a predetermined period of time has elapsed since the power was restored and the battery 214 has sufficient power to allow another save state operation to be performed. At step 808, information handling system 100 (FIGS. 1 and 2) is operating on external AC power. During AC power operation, backup power source 214 (FIG. 2) is being recharged or kept in a charged state. At step 816, the external AC power supply 206 (FIG. 2) is monitored by power supply controller 204 (FIG. 2). Upon detecting a power failure (blackout condition) or reduction of the voltage to an unacceptable level (brownout condition) in step 816, the UPS 200 is switched to battery operation in step 824, with system power 208 (FIG. 2) being provided to the host system 100 (FIGS. 1 and 2) by backup power source 214 (FIG. 2).

After switching to backup battery operation, the state of the hardware system is saved in step 832, employing a suspend to disk operation and, optionally, a suspend to RAM operation, as detailed above.

In one embodiment, the UPS 200 (FIG. 2) provides sufficient power so that during step 832, the main motherboard components (e.g., CPU, memory, control, I/O, PCI bus) may be kept operational long enough for the system state to be saved to disk. After it is determined in step 840 that the suspend (save state) operation is completed, the remaining components are gracefully shut down in step 848. Where the optional suspend to RAM operation is performed in step 832 in addition to the suspend to disk operation, the memory and memory controller are kept operational to preserve the contents of RAM 104 (FIG. 1), powered by the UPS 200 (FIG. 2.).

The process waits at step 856 until external AC power is restored. Upon restoration of the external AC power at step 856, a timer is started and the battery voltage is monitored at step 868. The process 800 loops at steps 860, 866, and 862. At step 860, should AC power fail again, process 800 returns to step 856. If either the predetermined time period elapses (step 762) or the battery has or attains a sufficient capacity to perform another save state operation, the system state is restored in step 872. In restoring the system state in step 872, the system state may be restored from the suspend to disk state, or, when the optional step of suspending the system state of RAM was performed and the backup power source 214 was not completely dissipated, the system may be resumed from the suspend to RAM state. The process 800 may then return to normal AC operation and return to step 808.

In some embodiments, the performance of the save state operation in each of the above described embodiments of FIGS. 4–8 may automatically occur upon a loss of AC power. This provides the advantages of allowing the state of an unattended computer to be saved. Also, since the save state operation can be performed very shortly after detecting a loss of AC power, the backup power supply may be relatively small, thus reducing the cost of the system.

In other embodiments, a user may be given an option of allowing the system state to be automatically saved in the manner set forth in the embodiments above or to manually save any work currently in progress and manually shut down the system after a power failure and switch to backup battery operation.

Figure 9:
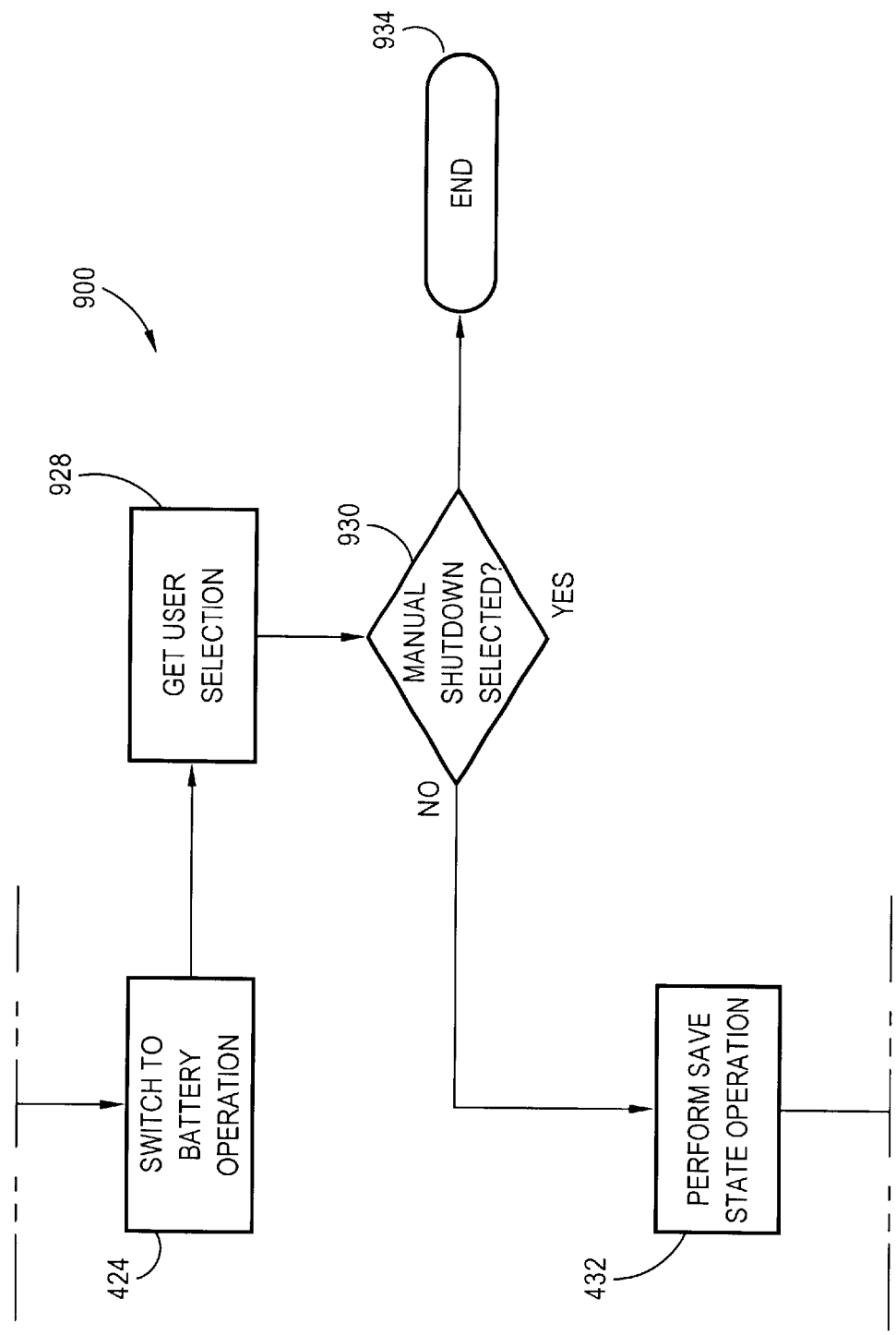

FIG. 9 illustrates a variation of the above described embodiments of FIGS. 4–8 wherein a user option is provided. Although the embodiment of FIG. 9 is discussed by way of reference to FIG. 4 only for the sake of brevity, it will be recognized that it may be employed with any of the above described embodiments. A user option provided in step 928 after switching to backup battery operation in step 424 (FIG. 4) and before the hardware state is saved in step 432 (FIG. 4). The user selection may be previously input the form of a user preference, control panel or power management setting, or the like, or alternatively, the choice may be offered to the user after an AC power failure and the switch to battery operation has occurred, for example, in the form of a pop up menu, dialog box, or the like. Optionally, where a user is given an input menu or dialog box, the time that a user is given to select the between the options may be limited to conserve backup power, and the process automatically continuing with step 432 et seq. (FIG. 4) if the user has not selected a manual shut down option within a predetermined period if time. Although not limited to any specific time period, the time period for user input in step 928 may be a relatively brief period of time, for example, from about 5 seconds to about 30 seconds. If manual shutdown is selected in step 930, the process ends (934) and the user may then manually shut down the system. A warning that external power has been lost may also be provided. If manual shutdown is not selected in step 930, the process continues to step 432 et seq. (FIG. 4).

Figure 10:
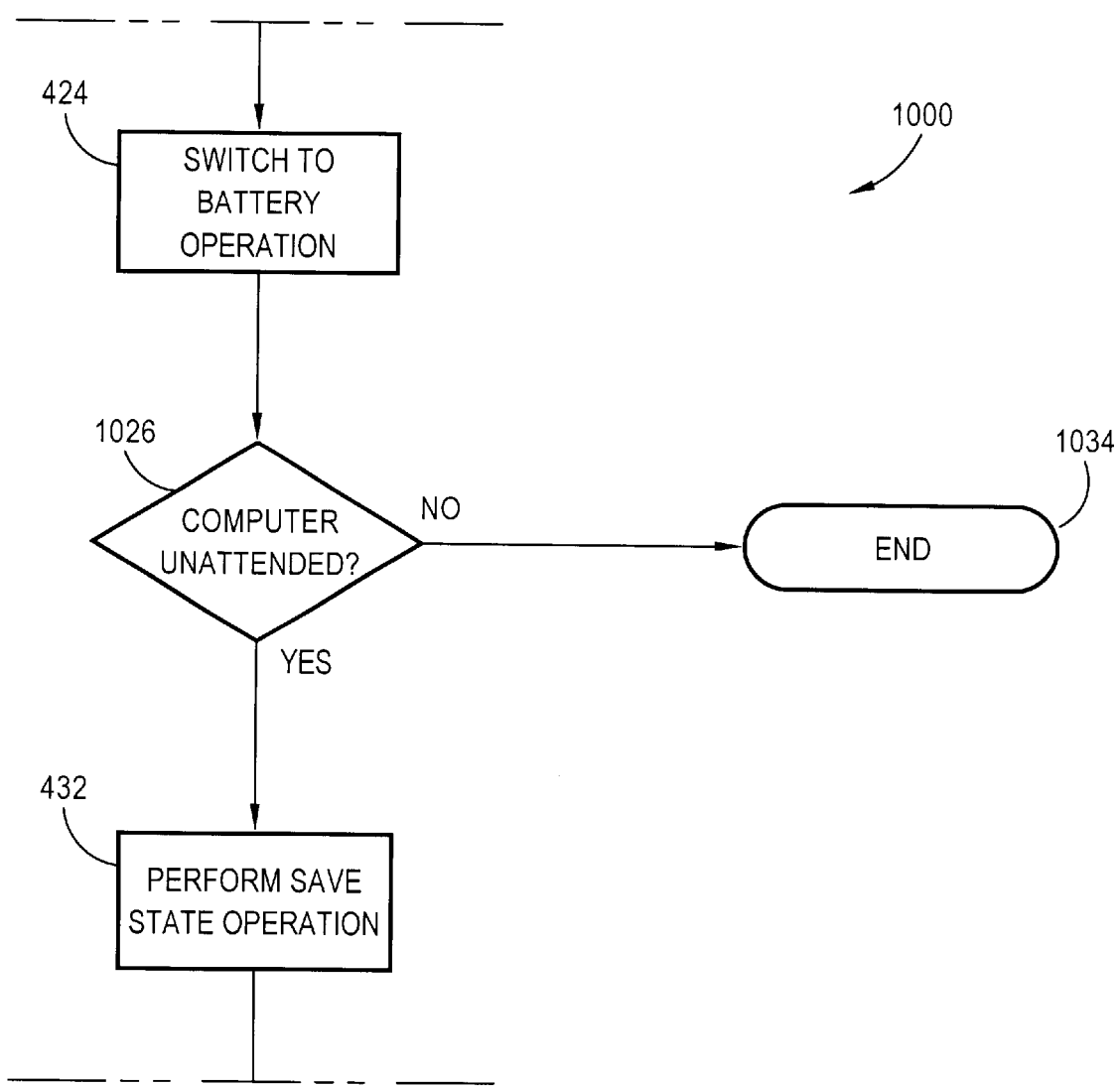

FIG. 10 illustrates a variation of the above described embodiments of FIGS. 4–8 wherein it is determined whether the system is unattended, e.g., as may be determined if the system has remained idle for a predetermined and preferably user selectable period of time. Although the embodiment of FIG. 10 is discussed by way of reference to FIG. 4 only for the sake of brevity, it will be recognized that it may be employed with any of the above described embodiments. In the embodiment of FIG. 10, it is determined whether the system is unattended in step 1026, after switching to backup battery operation in step 424 (FIG. 4) and before the hardware state is saved in step 432 (FIG. 4). If the system is determined to be unattended, for example, if the system has been idle for a predetermined period of time, then the process automatically saves the system state, continuing on to step 432 et seq. (FIG. 4). Although not limited to any specific time period, the predetermined period of inactivity may range, an exemplary range may be from several minutes to an hour or longer, and is preferably user selectable. If the system is determined to be in use at step 1026, the process ends (1034) and the user may be given a warning that external power has been lost and to save work and shut down the system immediately.

In an alternative embodiment of FIG. 10, not shown, even if the system is determined to be in use at step 1026, if the system is not manually shut down within a predetermined period of time, the UPS system according to the present invention may automatically save the system state, continuing on to step 432 et seq. (FIG. 4).

Figure 11:
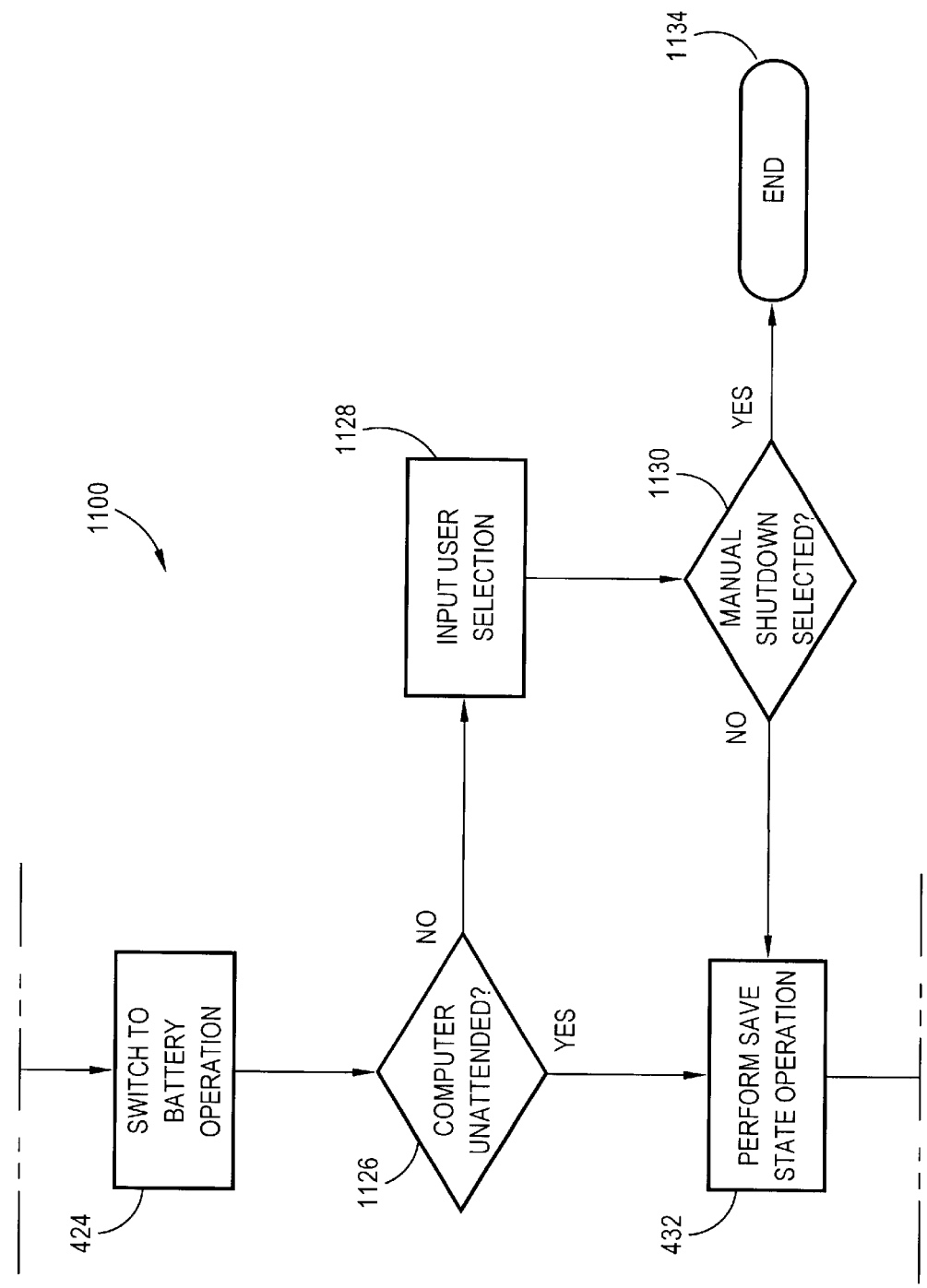

In further embodiments, as illustrated in FIG. 11, the performance of the save state operation will automatically proceed if the host system is unattended, and the user is given an option of automatic or manual shut down if the system is in use. Although the embodiment of FIG. 11 is discussed by way of reference to FIG. 4 only for the sake of brevity, it will be recognized that it may be employed with any of the above described embodiments. In the embodiment of FIG. 11, it is determined whether the system is unattended in step 1126, after switching to backup battery operation in step 424 (FIG. 4) and before the hardware state is saved in step 432 (FIG. 4). If the system is determined to be unattended at step 1126, for example, if the system has been idle for a predetermined period of time, then the process automatically saves the system state, continuing on to step 432 et seq. (FIG. 4). Although not limited to any specific time period, the predetermined period of inactivity may. range, for example, from several minutes to an hour or longer, and is preferably user selectable.

If the system is determined to be in use at step 1126, a user option is provided in step 1128 after switching to backup battery operation in step 424 (FIG. 4) and before the hardware state is saved in step 432 (FIG. 4). The user selection may be previously input the form of a user preference, control panel or power management setting, or the like, or alternatively, the choice may be offered to the user after an AC power failure and the switch to battery operation has occurred, for example, in the form of a pop up menu, dialog box, or the like. Optionally, where a user is given an input menu or dialog box, the time that a user is given to select the between the options may be limited to conserve backup power, and the process automatically continuing with step 432 et seq. (FIG. 4) if the user has not selected a manual shut down option within a predetermined period if time. Although not limited to any specific time period, the time period for user input in step 1128 may be a relatively brief period of time, for example, from about 5 seconds to about 30 seconds. If manual shutdown is selected in step 1130, the process ends (1134). If manual shutdown is not selected in step 1130, the process continues to step 432 et seq. (FIG. 4). In an alternative embodiment, not shown, even if the system is determined to be in use at step 1126 and manual shut down is selected at step 1130, the process automatically saves the system state, continuing on to step 432 et seq. (FIG. 4), if the system is not manually shut down within a predetermined period of time.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as the auxiliary memory of FIG. 1, for example in a hard disk drive or in a removable memory such as an optical disk for utilization in a DVD-ROM or CD-ROM drive, a magnetic media for utilization in a magnetic media drive, a magneto-optical disk for utilization in a magneto-optical drive, a floptical disk for utilization in a floptical drive, or a memory card for utilization in a card slot. Further, the set of instructions can be stored in the memory of another computer and transmitted over a local area network or a wide area network, such as the Internet, when desired by the user. Additionally, the instructions may be transmitted over a network in theform of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents. All references cited herein are expressly incorporated herein by reference in their entireties.

What is claimed is:

1. An information handling system, said information handling system being of the type operated on a primary power supply, said information handling system comprising:
   a detector for detecting a failure of the primary power supply;
   a backup power supply for supplying power to the information handling system in the event of a failure of the primary power supply, said backup power supply sufficient to allow the information handling system to perform a data saving function upon the failure of the primary power supply; and
   a detector for detecting a backup power level of the backup power supply,
   wherein the information handling system is prevented from resuming operation after a failure of the primary power supply until the detector detects that the backup power level is sufficient to permit the information handling system to perform another data saving function.

2. An information handling system according to claim 1, wherein backup power is supplied only to components of said information handling system necessary to save data characterizing the hardware state of the information handling system to a nonvolatile storage medium.

3. An information handling system according to claim 2, wherein said nonvolatile storage medium comprises a hard disk drive.

4. An information handling system according to claim 1, wherein backup power is supplied only to components of said information handling system necessary to save data characterizing the hardware state of the information handling system to both a volatile and a nonvolatile storage medium.

5. An information handling system according to claim 4, wherein said volatile storage medium comprises RAM and said nonvolatile storage medium comprises a hard disk drive.

6. An information handling system according to claim 1, wherein said detector for detecting a failure of said primary power supply, said backup power supply, and said detector for detecting the backup power level are integrated within a main housing of said information handling system.

7. An information handling system according to claim 1, further comprising:
   means for preventing said information handling system from resuming operation based upon the backup power level.

8. An information handling system, said information handling system being of the type operated on a primary power supply, said information handling system comprising:
   a detector for detecting a failure of the primary power supply;
   a backup power supply for supplying power to the information handling system in the event of a failure of the primary power supply, said backup power supply sufficient to allow the information handling system to perform a data saving function upon a failure of the primary power supply; and
   wherein, upon restoration of the primary power supply after a failure thereof, the information handling system is prevented from resuming operation until after a predetermined period of time has elapsed.

9. An information handling .system according to claim 8, wherein backup power is supplied only to components of said information handling system necessary to save data characterizing the hardware state of the information handling system to a nonvolatile storage medium.

10. An information handling system according to claim 9, wherein said nonvolatile storage medium comprises a hard disk drive.

11. An information handling system according to claim 8, wherein backup power is supplied only to components of said information handling system necessary to save data characterizing the hardware state of the information handling system to both a volatile and a nonvolatile storage medium.

12. An information handling system according to claim 11, wherein said volatile storage medium comprises RAM and said nonvolatile storage medium comprises a hard disk drive.

13. An information handling system according to claim 8, wherein said backup power supply and said detector for detecting a failure of said primary power supply are integrated within a main housing of said information handling system.

14. An information handling system according to claim 8, further comprising:
   means for preventing said information handling system from resuming operation based upon the predetermined amount of time being elapsed following the restoration of the primary power supply.

15. An uninterruptible power supply for an information handling system, said information handling system being of the type operated on a primary power supply, said uninterruptible power supply comprising:
   a detector for detecting a failure of said primary power supply, a backup power supply for supplying power to the information handling system in the event of a failure of said primary power supply, said backup power supply sufficient to allow said information handling system to perform a data saving function upon the failure of said primary power supply; and a detector for detecting the backup power level of the backup power supply;

wherein the information handling system is prevented from resuming operation after a failure of said primary power supply until the detector detects that the backup power level is sufficient to permit the information handling system to perform another data saving function.

16. An uninterruptible power supply according to claim 15, further comprising:

means for preventing said information handling system from resuming operation based.

17. An uninterruptible power supply for an information handling system, said information handling system being of the type operated on a primary power supply, said uninterruptible power supply comprising:

a detector for detecting a failure of said primary power supply; and a backup power supply for supplying power to the information handling system in the event of a failure of said primary power supply, said backup power supply sufficient to allow said information handling system to perform a data saving function upon a failure of said primary power supply;

wherein, upon restoration of said primary power supply after a failure thereof, the information handling system is prevented from resuming operation until after a predetermined period of time has elapsed.

18. An uninterruptible power supply according to claim 17, further comprising:

means for preventing said information handling system from resuming operation based upon the predetermined amount of time being elapsed following the restoration of the primary power supply.

19. An information handling system comprising an uninterruptible power supply, said information handling system being of the type operated on a primary power supply, said uninterruptible power supply comprising:

a backup power supply for supplying power to the information handling system in the event of a failure of said primary power supply, said backup power supply sufficient to allow said information handling system to perform a data saving function upon a failure of said primary power supply;

a microprocessor for detecting a failure of said primary power supply, said microprocessor comprising control logic for switching operation of said information handling system from said primary power supply to said backup power supply upon detection of a power failure, and said microprocessor further comprising control logic for monitoring a power level of said backup power supply; and control logic for preventing said information handling system from resuming operation upon restoration of said primary power supply after a power failure until the power level is sufficient to permit the information handling system to perform another data saving function.

20. An information handling system comprising an uninterruptible power supply, said information handling system being of the type operated on a primary power supply, said uninterruptible power supply comprising:

a backup power supply for supplying power to the information handling system in the event of a failure of said primary power supply, said backup power supply sufficient to allow said information handling system to perform a data saving function upon a failure of said primary power supply;

a microprocessor for detecting a failure of said primary power supply, said microprocessor comprising control logic for switching operation of said information handling system from said primary power supply to said backup power supply upon detection of a power failure; and control logic for preventing said information handling system from resuming operation upon restoration of said primary power supply after a power failure until after a predetermined period of time has elapsed since said restoration of said primary power supply.

21. A method of providing backup power in an information handling system, comprising the steps of:

providing a primary power supply and a backup power supply;

detecting whether the primary power supply is interrupted;

operating the computer from a backup power supply if said primary power supply is interrupted;

performing a save state operation comprising saving data characterizing the state of the information handling system to a nonvolatile storage device;

shutting down the information handling system;

detecting whether said external power supply has been restored;

when said external power supply has been restored, determining whether it is safe to restore the saved state of the information handling system;

preventing a restoration of the saved state of the information handling system until it is determined that it is safe to restore the saved state of the information handling system; and if it is determined that it is safe to restore the saved state of the information handling system, performing a restore state operation comprising restoring the saved state of the information handling system.

22. A method according to claim 21, wherein backup power is supplied only to components of said information handling system necessary to save data characterizing the hardware state of the information handling system to a nonvolatile storage medium.

23. A method according to claim 22, wherein said nonvolatile storage medium comprises a hard disk drive.

24. A method according to claim 21, wherein backup power is supplied only to components of said information handling system necessary to save data characterizing the hardware state of the information handling.system to both a volatile and a nonvolatile storage medium.

25. A method according to claim 24, wherein said volatile storage medium comprises RAM and said nonvolatile storage medium comprises a hard disk drive.

26. A method according to claim 21, wherein said backup power supply is integrated within a main housing of said information handling system.

27. A method according to claim 21, wherein the step of determining whether it is safe to restore the saved state of the information handling system comprises waiting until a predetermined period of time has elapsed after said external power supply has been restored.

28. A method according to claim 21, wherein the step of determining whether it is safe to restore the saved state of the information handling system comprises determining whether a power level of the backup power supply is sufficient to permit the information habdling system to perform another save state operation.

29. A method according to claim 21, wherein the step of performing a save state operation further comprises saving data characterizing the state of the information handling system to volatile memory and preserving the contents thereof by applying power from said backup power supply. Information handling system to perform another save state operation.

30. A method according to claim 29, wherein the step of performing a restore state operation comprises restoring the saved state of the information handling system from said volatile memory if the saved state of the information handling system is successfully preserved therein during the power interruption, and, restoring the saved state of the information handling system from said nonvolatile memory if the saved state of the information handling system is not successfully preserved therein.

31. An information handling system, comprising:
- a power storage device for supplying power to the information handling system; and
- a detector for detecting the power level of the storage device;

wherein the information handling system is prevented from resuming operation until the detector detects that the power level of the power storage device is sufficient to permit the information handling system to perform a data saving function.

* * * * *